Patented Oct. 30, 1928.

1,689,581

UNITED STATES PATENT OFFICE.

MORGAN ROBERT DAY, OF BOSTON, MASSACHUSETTS, ASSIGNOR TO RUBBER LATEX RESEARCH CORPORATION, OF BOSTON, MASSACHUSETTS, A CORPORATION OF MASSACHUSETTS.

STABILIZED LATEX AND PROCESS OF PRODUCING SAME.

No Drawing. Application filed January 3, 1927, Serial No. 158,828. Renewed March 27, 1928.

This invention relates to stabilized latices and processes of producing same; and it comprises as a new material an alkaline latex containing dissolved blood or blood components, and particularly the "hemoglobin" portion of the blood; and it further comprises the process of stabilizing latex which comprises dissolving therein blood or blood constituents in amount corresponding to 5 to 25 per cent of the contained rubber; all as more fully hereinafter set forth and as claimed.

Latex is the milky juice obtained by tapping Hevea. As obtained, it is a solution and suspension of very many things but the main constituent, amounting often to 20 to 30 per cent of the total liquid, is the substance which on coagulation or gelling produces caoutchouc or rubber. In its natural state latex readily penetrates capillares and, although an emulsion, for most practical purposes behaves like a mobile, homogeneous liquid. The liquid is readily coagulated by acids and also by very many other things; phenols, tannins, alcohol, etc. It is coagulated by agitation. For commercial purposes latex is stabilized by the addition of a little ammonia and then withstands transportation and ordinary handling. Latex is now much used in the production of compositions or articles containing rubber. By simple acidulation it coagulates to give the ordinary type of raw rubber while by drying down without coagulation it gives gelled rubber; a substance much like long milled raw rubber.

Ammonia however does not completely stabilize latex; the latex is still coagulable under various conditions. This seriously restricts its applicability for technical purposes. In contact with a nucleus of raw rubber, coagulation rapidly ensues and the same is often true in the case of partially cured rubber. And many of the ordinary fillers and fibers, such for instance as carbon black and asbestos, exercise specific coagulative action. Various woods and fibers have the same coagulating property though in a less degree. And even where no specific coagulative effect of a filler or mix component exists, long-continued agitation or energetic mixing may produce coagulation. It is for example sometimes difficult to make abrasive articles with a latex bond because of the great amount of mechanical work necessary.

The natural latex contains a considerable amount of proteid bodies, and other proteids such as casein and glue are sometimes added for one purpose or another. Casein and glue added in any reasonable amount do not prevent coagulation of ammoniacal latex under the described conditions.

I have however found that blood acts as a protective colloid and an addition of blood or of its constituents, substantially restrains the action of all coagulants excepting the acids though even with these the restraining effect is pronounced. In the present invention therefore I stabilize latex by an addition of blood or of its constituents. The whole blood may be used or certain fractions thereof. The stabilizing property appears to be common to all the bloods from various sources which I have tested, notably ox blood and pig blood. In the utilization of slaughter house blood, it is now a common expedient to run the blood through special centrifugals, thereby obtaining a liquid product containing the fibrinogen and serum and a heavier product, the "red end", consisting of substantially pure hemoglobin. This "red end" or hemoglobin fraction appears to be as effective for my purposes as the whole blood. The "red end" appears on the market either as a fluent preparation sterilized with sodium fluorid or as a dry powder. Either may be used for my purposes. Oxidation by the air converts hemoglobin (or "hæmoglobin") into methemoglobin which is equivalent for my purposes. While I think hemoglobin or methemoglobin the best for my purposes, the whole blood, (liquid or dry), defibrinated blood or fluid or dry serum may be used. All these are on the market and all are useful.

The amount of blood proteid, used in the present invention, varies with the amount of stability required of the latex. Where it is simply a matter of incorporating fillers or fibers having a coagulative action, such as carbon black or asbestos, into latex not much blood is required. In such cases with commercial latex containing 30 per cent rubber I commonly use about 2 per cent of blood proteids (on a dry basis); 5 or 6 per cent on the rubber present. On the other hand in stabilizing latex for use in making abrasive articles and in general where considerable mechanical work is to be done on the materials in mixing, the amount of blood proteid required may rise as high as 8 or 10 per cent on the latex or, say, 25 per cent on the contained rubber. Latex containing blood may be coagulated by acids in the same way as the original latex; but it is much more insensitive to other coagulating agents. The new stabilized latex can be used in conjunction with casein, glue, or with any ordinary filler. It can also be used in mixes containing uncured rubber and partially cured rubber without coagulation occurring. This is a particularly valuable property since it facilitates making rubber compositions containing rubber scrap.

In practicing the present invention, the blood or a blood preparation such as the "red end", is simply dissolved in the latex at ordinary temperature. Solution takes place readily and the physical properties of the latex are not materially changed except as to coagulability. However, if the stabilized latex is to be kept for any length of time and if the blood does not already contain a preservative, some preservative should be added. Sodium fluorid in minimal proportions is a good preservative.

What I claim is:—

1. As a new material, stabilized latex containing blood proteid.
2. As a new material, stabilized latex containing the "red end" of blood.
3. Stabilized latex containing 1 to 10 per cent of blood proteid.
4. Stabilized latex containing 1 to 10 per cent of the red end of blood.
5. In the stabilization of latex against coagulation the process which comprises adding thereto 1 to 10 per cent of blood proteid.
6. In the stabilization of latex against coagulation the process which comprises adding thereto 1 to 10 per cent of the red end of blood.

In testimony whereof, I have hereunto affixed my signature.

MORGAN ROBERT DAY.

DISCLAIMER 1,689,581.—*Morgan Robert Day*, Boston, Mass. STABILIZED LATEX AND PROCESS OF PRODUCING SAME. Patent dated October 30, 1928. Disclaimer filed May 22, 1931, by the assignee, *Rubber Latex Research Corporation*.

Therefore, enters this disclaimer as to claim 1 of said Letters Patent No. 1,689,581 which is in the following words:

"1. As a new material, stabilized latex containing blood proteid."

And your petitioner, therefore, disclaims from the scope and meaning of claim 2 of said Letters Patent No. 1,689,581 any interpretation of the phrase "containing the 'red end' of blood" other than that the red end of blood contained in the stabilized latex is the isolated or separated fraction consisting substantially of the red end of blood.

[*Official Gazette June 16, 1931.*]

required may rise as high as 8 or 10 per cent on the latex or, say, 25 per cent on the contained rubber. Latex containing blood may be coagulated by acids in the same way as the original latex; but it is much more insensitive to other coagulating agents. The new stabilized latex can be used in conjunction with casein, glue, or with any ordinary filler. It can also be used in mixes containing uncured rubber and partially cured rubber without coagulation occurring. This is a particularly valuable property since it facilitates making rubber compositions containing rubber scrap.

In practicing the present invention, the blood or a blood preparation such as the "red end", is simply dissolved in the latex at ordinary temperature. Solution takes place readily and the physical properties of the latex are not materially changed except as to coagulability. However, if the stabilized latex is to be kept for any length of time and if the blood does not already contain a preservative, some preservative should be added. Sodium fluorid in minimal proportions is a good preservative.

What I claim is:—

1. As a new material, stabilized latex containing blood proteid.
2. As a new material, stabilized latex containing the "red end" of blood.
3. Stabilized latex containing 1 to 10 per cent of blood proteid.
4. Stabilized latex containing 1 to 10 per cent of the red end of blood.
5. In the stabilization of latex against coagulation the process which comprises adding thereto 1 to 10 per cent of blood proteid.
6. In the stabilization of latex against coagulation the process which comprises adding thereto 1 to 10 per cent of the red end of blood.

In testimony whereof, I have hereunto affixed my signature.

MORGAN ROBERT DAY.

DISCLAIMER 1,689,581.—*Morgan Robert Day*, Boston, Mass. STABILIZED LATEX AND PROCESS OF PRODUCING SAME. Patent dated October 30, 1928. Disclaimer filed May 22, 1931, by the assignee, *Rubber Latex Research Corporation*.

Therefore, enters this disclaimer as to claim 1 of said Letters Patent No. 1,689,581 which is in the following words:

"1. As a new material, stabilized latex containing blood proteid."

And your petitioner, therefore, disclaims from the scope and meaning of claim 2 of said Letters Patent No. 1,689,581 any interpretation of the phrase "containing the 'red end' of blood" other than that the red end of blood contained in the stabilized latex is the isolated or separated fraction consisting substantially of the red end of blood.

[*Official Gazette June 16, 1931.*]